Patented Jan. 14, 1930

1,743,176

UNITED STATES PATENT OFFICE

WALTER T. WINCKLER, OF CHICAGO, ILLINOIS, ASSIGNOR TO THE VON WINKLER CHEMICAL CO., OF CHICAGO, ILLINOIS, A CORPORATION OF ILLINOIS

PROCESS OF MAKING A FIRE-RESISTING MATERIAL

No Drawing. Application filed February 2, 1927. Serial No. 165,487.

This invention relates to the making and utilizing of a silica flux which has a wide range of melting points depending on the proportions of materials used, and which is adaptable for use in a great many different arts and industries.

The main objects of this invention are to provide a new and improved method of manufacturing a water-proof and fire resisting material; to provide a mixture of silica and fluxes which when mixed with asbestos fibre or other suitable material produces a fireproof and water-proof product that may be formed in suitable shapes to be used for wallboards, bricks, shingles, and other building materials.

In the carrying out of this process, I use ten (10) parts of silica mixed with eight (8) parts of lead oxide, eight (8) parts of borax and one (1) part of calcium carbonate. These ingredients are mixed together, placed in a furnace and melted or fused until they become a homogenous glassy mass. The mixture made from the foregoing proportions will have a melting point of from 300° to 400° C.

This mixture of silica fluxes can be governed in its melting points by varying the amount of alkali used and where it is desired to use the mixture in the manufacture of asbestos shingles it is desirable to have the melting point of the mixture at a high degree as the higher the melting point the more resistant and endurable the mixture will be.

The method employed in the making of asbestos shingles is to mix ten (10) parts of silica, eight (8) parts of potassium carbonate, eight (8) parts of lead oxide and two (2) parts of calcium carbonate. The materials are then fused in a homogeneous mass as before, and the silical flux is mixed with the asbestos pulp in the proportions of 50% of mixture to 50% of asbestos or to make a lower grade of shingle, a less amount of the mixture can be used such as 40% or 30%. The mixture of mixture and asbestos pulp is then placed in molds and heat and pressure applied until the mixture flows, thereby making a shingle of the desired shape which is absolutely waterproof, fireproof and of tremendous durability.

The mixture can also be used to make a waterproof brick, by mixing 50% of flux with 50% of aluminum silica, such as fire clay, and baking the brick in the regular way. The result will be a waterproof building brick that will not absorb mixture.

Where mixture of silica and fluxes is being used for waterproofing and fireproofing materials, excellent results can be obtained by mixing 50% of the flux with 50% of calcium hydrate. Of this mixture, 25% to 30% can be incorporated into a fibrous material and afterwards passed through a solution of sodium silica which will form insoluble calcium silica.

Another method of treating fibrous materials to make a building board or the like is to mix 50% of fibrous material with 25% of silica flux and 25% of a half and half mixture of dry calcium hydrate and dry sodium silicate. This composition is formed into the sheets or boards, moistened with water and then run through rollers heated sufficiently to cause the flux to flow. The resulting product will be an absolutely waterproof, fireproof, and insoluble composition.

Although several different adaptations and uses for this mixture of silica and fluxes have been herein outlined and described, it will be understood that there are a great variety of other uses in the different arts and trades, to which this mixture of silica and fluxes is adaptable and it will be understood that the proportions of the ingredients and the methods of mixing and using them may be altered without departing from the spirit of this invention as defined by the following claims:

I claim:

1. The process of making a fire resisting material comprising the mixing of silica with a flux, fusing the materials into a homogeneous mass, comminuting the mass, mixing the comminuted mass with a non-inflammable material, and then applying heat and pressure thereto until the flux flows.

2. The process of making a fire resisting material comprising the mixing of silica with a flux, fusing the materials into a homogeneous mass, comminuting the mass, mixing the comminuted mass with a non-inflammable fibrous material, and then applying heat and pressure thereto until the flux flows.

3. The process of making a fire resisting material comprising the mixing of silica with a flux, fusing the materials into a homogeneous mass, comminuting the mass, mixing the comminuted mass with an inorganic non-inflammable fibrous material, and then applying heat and pressure thereto until the flux flows.

4. The process of making a fire resisting material comprising the mixing of silica with a flux, fusing the materials into a homogeneous mass, comminuting the mass, mixing the comminuted mass with asbestos, and then applying heat and pressure thereto until the flux flows.

5. The process of making a fire resisting material comprising the mixing of silica, lead oxide, borax and calcium carbonate, fusing the said materials into a homogeneous mass, comminuting the resultant mass, mixing the comminuted mass with a fibrous material, and then applying heat and pressure thereto sufficient to cause the mass to flow so as to form a coating around the individual fibers of said fibrous material.

Signed at Chicago this 10th day of December 1926.

WALTER T. WINCKLER.